United States Patent
Hanimann et al.

(10) Patent No.: US 7,993,557 B2
(45) Date of Patent: Aug. 9, 2011

(54) METHOD FOR THE PRODUCTION OF POLYESTER GRANULATES FROM HIGHLY VISCOUS POLYESTER MELTS AND ALSO DEVICE FOR THE PRODUCTION OF THE POLYESTER GRANULATES

(75) Inventors: Kurt Hanimann, Rodels (CH); Eike Schulz Van Endert, Berlin (DE); Theodor Anton Bruckmann, Greven-Gimbte (DE)

(73) Assignees: Uhde Inventa-Fischer GmbH, Berlin (DE); BKG Bruckmann & Kreyenborg, Munster (DE)

( * ) Notice: Subject to any disclaimer, the term of this patent is extended or adjusted under 35 U.S.C. 154(b) by 185 days.

(21) Appl. No.: 12/195,962

(22) Filed: Aug. 21, 2008

(65) Prior Publication Data

US 2009/0072423 A1 Mar. 19, 2009

Related U.S. Application Data

(60) Provisional application No. 60/957,806, filed on Aug. 24, 2007.

(51) Int. Cl.
*B29B 9/10* (2006.01)
(52) U.S. Cl. .......................................... 264/142; 264/5
(58) Field of Classification Search .................. 264/142, 264/5
See application file for complete search history.

(56) References Cited

U.S. PATENT DOCUMENTS

| 2,880,519 | A | 4/1959 | Pollock | |
|---|---|---|---|---|
| 2003/0109640 | A1* | 6/2003 | Lee et al. | 525/222 |
| 2005/0163679 | A1 | 7/2005 | Schulz Van Endert et al. | |
| 2007/0073037 | A1* | 3/2007 | Otto et al. | 528/480 |
| 2007/0132134 | A1* | 6/2007 | Eloo | 264/143 |

FOREIGN PATENT DOCUMENTS

| DE | 23 47 013 | 3/1975 |
|---|---|---|
| DE | 31 20 792 | 12/1982 |
| DE | 42 16 960 | 8/1993 |
| DE | 1005 010 706 | 9/2006 |
| DE | 10 2006 027 176 | 3/2007 |
| WO | WO 03/042278 | 5/2003 |

OTHER PUBLICATIONS

English translation of the abstract of DE 42 16 960.7.
English translation of the abstract of DE 10 2005 010 706.
English translation of the abstract of DE 32 20 792.
"Why should you choose GALA's centrifugal drying system?", Gala Industries., XP-002512385.

* cited by examiner

*Primary Examiner* — Joseph S Del Sole
*Assistant Examiner* — Kimberly A Stewart
(74) *Attorney, Agent, or Firm* — Millen, White, Zelano & Branigan, P.C.

(57) ABSTRACT

The invention relates to a method and device for the direct production of polyester granulate from a highly viscous polyester melt with a polymerization degree of 132 to 165, as well as the granulates formed thereform. In the method, the highly viscous polyester melt is subjected to a pre-drying and drying/degassing after a hot cutting method. Hot cutting is implemented at water temperatures of 70° C. to 95° C. and with a liquid to solid ratio of 8 to 12:1.

19 Claims, 2 Drawing Sheets

Figure 1:
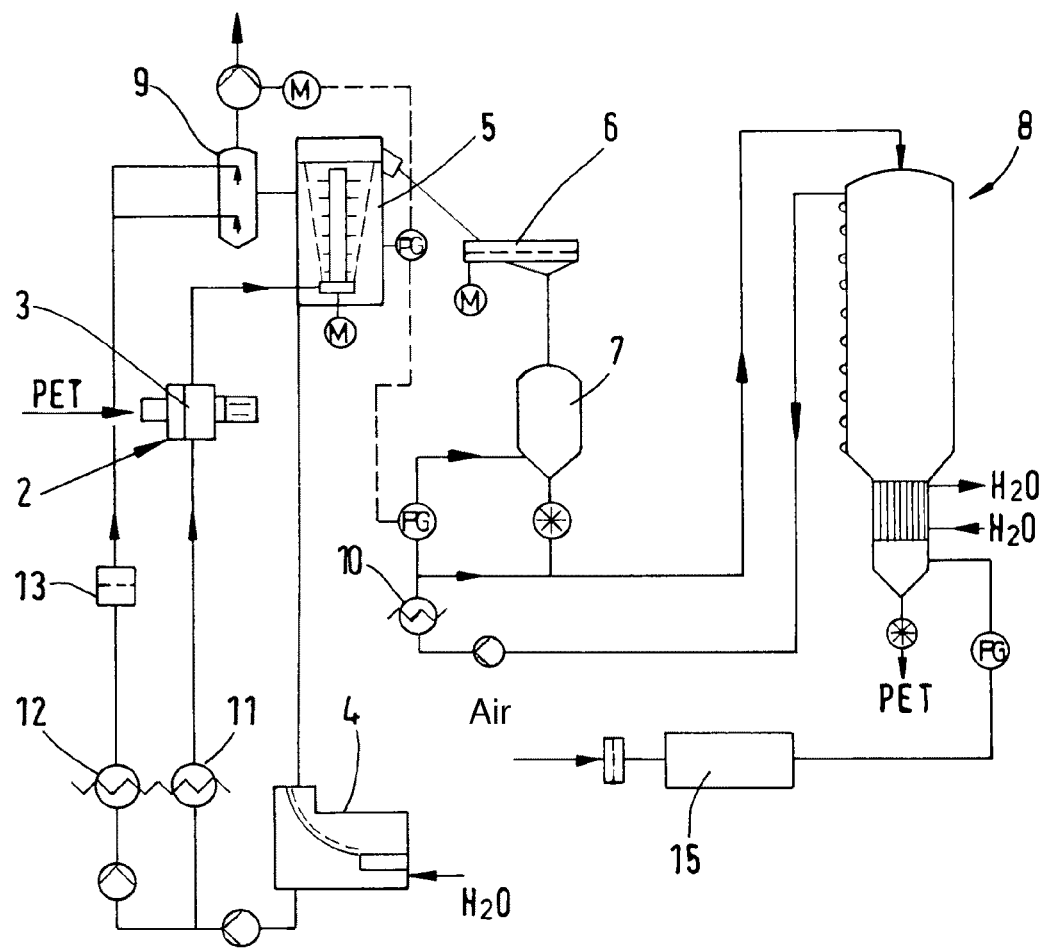

METHOD FOR THE PRODUCTION OF POLYESTER GRANULATES FROM HIGHLY VISCOUS POLYESTER MELTS AND ALSO DEVICE FOR THE PRODUCTION OF THE POLYESTER GRANULATES

This application claims the benefit of the filing date of U.S. Provisional Application Ser. No. 60/957,806 filed Aug. 24, 2007.

The present invention relates to a method for the continuous production of polyester granulates from highly viscous polyester melts which is characterised in that the reduction in the polycondensation degree starting from the polyester melt to the polyester granulate is less than 2%. The invention relates in addition to a polyester granulate which is produced with this method, and also to a device for the production of the granulate.

A series of methods has been developed for the production of polyester granulates, in particular PET (polyethylene terephtalate), which methods press the molten polymer out of a nozzle and the obtained "strands" are then cooled in a water bath such that these solidify, then are cut by means of a cutting device to form cylindrical chips, thereafter are cooled further to 50° C. to 60° C. and subsequently are treated to a surface drying after removing the conveying water quantity in a centrifugal dryer or in another drying appliance. These chips are then ready for a subsequent treatment device for increasing the viscosity, which generally comprises a plurality of steps, e.g. crystallisers, and one or more reactors and is operated under inert gas at up to 220° C.

A further method which has become more and more accepted even for PET is "die-face" cutting or also hot cutting. It differs in that the nozzle, from which the polymer is pressed out, is in direct contact with the cutting- and water chamber, a circulating water flow constantly conveying away the "pellets" of a round to oval form which are produced by a simple blade ring passing by the nozzle holes, the melt heat being withdrawn and supercooling of the "pellets" taking place. The chips/water mixture is separated and the surface water is removed in an agitating centrifuge so that pre-dried granulate is obtained at the end which is conveyable.

This method was improved with respect to use of the internal heat of the polymer for crystallisation of the polyester in that the cooling of the melt is interrupted below the melting point at temperatures of 100° C. to 190° C. In this range, crystallisation begins and, by subsequent arrangement of a horizontal crystallisation channel, crystallisation grades of >38% are achieved, which suffice to avoid adhesion (agglomeration) of the chips at higher further processing temperatures, e.g. in a drying or subsequent condensation unit. On the other hand, the still hot "pellets" can be further temperature-controlled at a constant temperature for further drying and gas evolution of disruptive reaction by-products of the polyesters in a storage container over a few hours with slight through-flow with an entraining gas, e.g. air or an inert gas. Consequently, an already marketable resin product can be produced. The use of such devices has proved its worth for further conventional production of PET.

From WO 03/042278 A1, a corresponding method is known in addition for the production of high-molecular polyester. These PET products have, because of the large chain length, particular susceptibility to hydrolytic degradation under specific boundary conditions, such as high temperature with simultaneous presence of water or water vapour or also a long storage time with the effect of moisture. It has thereby been shown that when there is intensive contact of the melt with hot water with the formation of water vapour, strong hydrolysis must be taken into account which reduces the polycondensation degree within a few minutes by up to 20%.

For a new technology which, starting from highly viscous melt without the use of an energy-wise and intensively complex subsequent condensation, provides a finished product directly which is better comparably and qualitatively than the conventionally produced polyester granulate/pellets, disadvantages are evident which make industrial use difficult. The following defects in particular should be observed:

1. rapid hydrolysis in a water vapour atmosphere already in the pre-dryer,
2. inadequate control of the crystallisation,
3. high water losses by evaporation,
4. controllability of the subsequent isothermic drying.

Starting herefrom, it is the object of the present invention to indicate an improved method in which a hydrolytic degradation of the polycondensation degree of directly produced polyester granulates is avoided as far as possible. The granulate is intended in addition to have a low content of acetaldehyde (AA content).

A further object of the present invention is to indicate a corresponding granulate and a device for implementing such a method.

The object is achieved with reference to the method by a method for the direct production of polyester granulate from a highly viscous polyester melt (hiV) with a polymerization degree (PG) of 132 to 165, in which the hiV melt is subjected to a pre-drying and drying/degassing after a hot cutting method, characterized in that the cutting phase in the hot cutting method is effected at water temperatures of 70 to 95° C. and a liquid to solid ratio of 8 to 12:1 is maintained, by a granulate thus produced, having a polycondensation degree 2% less than that, and by a device for direct production of a polyester granulate from a highly viscous polyester melt (hiV) with a polymerization degree (PG) of 132 to 165, comprising hot cutting, a pre-dryer and a drying/degassing device, characterized in that the pre-dryer is configured as an agitating centrifuge.

According to the invention, it is proposed according to patent claim 1 to optimise the method in that the hot cutting is implemented at water temperatures of 70° C. to 95° C. and with a liquid to solid ratio of 8 to 12:1. It has now been shown that a polyester granulate or pellets can be obtained whilst maintaining these method conditions, the polycondensation degree of which is less than 2% below the polycondensation degree of the highly viscous (hiV) melt. Since now, with the method according to the invention, polyester granulates or pellets with a high polycondensation degree, as mentioned previously, can be obtained, it is possible furthermore to use these directly for a bottle and film application without intermediate devices for increasing viscosity, with which cooling of the granulate/pellets, intermediate storage, reheating and long-term temperature control at high temperature and also complex inert gas circulations and renewed cooling are associated.

The method according to the invention starts from a polyester melt which is produced with a continuous polycondensation unit, preferably a PET melt, with a polycondensation degree of up to 162. Methods of this type for producing highly viscous polyester are known per se in the state of the art. In this respect, see the already mentioned WO 03/042278 A1.

It was now shown surprisingly that, with the method according to the invention, merely a degradation of the polycondensation degree to values of less than 2%, preferably to values of less than 1.5%, relative to the polycondensation degree of the hiV melt are effected. It should be referred to with the method according to the invention in particular that normal water pre-separation, in order to relieve the pre-dryer, of the conveyed water from the supply pipe of the cutting device to the pre-dryer did not produce the expected reduction in hydrolysis, i.e. the forming water vapour had a significantly stronger effect on the hot surface of the pellets/granulates than a cooling water layer. It is thereby important in order to achieve the effect that the liquid to solid ratio, i.e. the ratio of water to pellets/granulate, is adjusted to a liquid to solid ratio of 8 to 12:1 and that the water temperature during the hot cutting is in the range of 80° C. to 90° C. Only small differences in hydrolysis effect resulted herefrom which are within the scatter range of the analysis.

During the method according to the invention, PET (polyethylene terephthalate) is preferably produced.

The following technical features emerge as crucial criteria for a minimised hydrolysis:
1. no pre-dewatering before the dryer,
2. rapid discharge of the conveying water in the dryer within <10 sec.,
3. rapid removal of the surface water within 30 s to 2 minutes,
4. low evaporation of residual water which has diffused into the polymer structure with continuing drying and efficient discharge thereof by means of dry preheated air in counterflow from the subsequently connected collection silo,
5. condensation of the water vapour/air mixture in a subsequently connected spray condenser, the water of which is removed from the conveying water circulation, cooled and returned to the main circulation after filtration,
6. control of the purging air with respect to quantity and dew point, which should be between −10° C. and −40° C., in the main drying for further removal of water and other volatile by-products of the polyester.

The invention also relates to the granulate which is produced according to the previously described method, preferably made of PET. The granulate according to the invention which is produced with the above-described method is characterised in particular in that its polycondensation degree is less than 2%, preferably less than 1.5%, relative to the polycondensation degree of the highly viscous polyester resin. Further essential features which characterise the granulate according to the invention are the crystallisation degree of less than 38% (density measuring method), a low-boiling proportion (e.g. AA, MDO etc.) of less than 1 ppm, preferably 0.5 to 0.9 ppm, and also an excellent colour which, according to specification, has a yellow value b* (CIELAB) of −1 to −3. The granulate according to the invention is characterised in addition in that its water proportion is less than 100 ppm and in that the granulate particle weight is less than 25 g, preferably <15 g. It is furthermore surprising that the produced granulate has a very low content of acetaldehyde (AA content) of <0.8 ppm. A further advantage of the granulate according to the invention is that its specific surface is >1.4 $m^2/kg$, preferably 1.6 to 1.8 $m^2/kg$. The granulate according to the invention is hence outstandingly suitable for all applications in the packaging industry and, due to its low crystallinity, offers additional advantages in bottle production which makes possible in particular a low reheating temperature and consequently reduces the renewed formation of low-boiling degradation products of the polyester and increases the speed of the production of preforms. Also no "high melts" in the preforms are established, which can be produced with conventional methods during a solid phase condensation since, in the new method, no increase in viscosity is effected because of the described low-temperature treatment.

The invention then relates furthermore to a device for the production of polyester granulate, preferably PET granulate, from a highly viscous polyester melt with a polycondensation degree of 132 to 165. The device is characterised in particular in that the pre-dryer is configured as an agitating centrifuge. In addition to formation of the pre-dryer as an agitating centrifuge, it is essential furthermore in the device that a specifically configured drying/degassing device is used. The drying/degassing device of the invention is characterised in particular in that it is configured in the form of a vertical cylindrical container and in that the container is subdivided into a zone of equal temperature and a cooling zone.

The invention is described subsequently in more detail by FIGS. 1 and 2.

Figure 2:
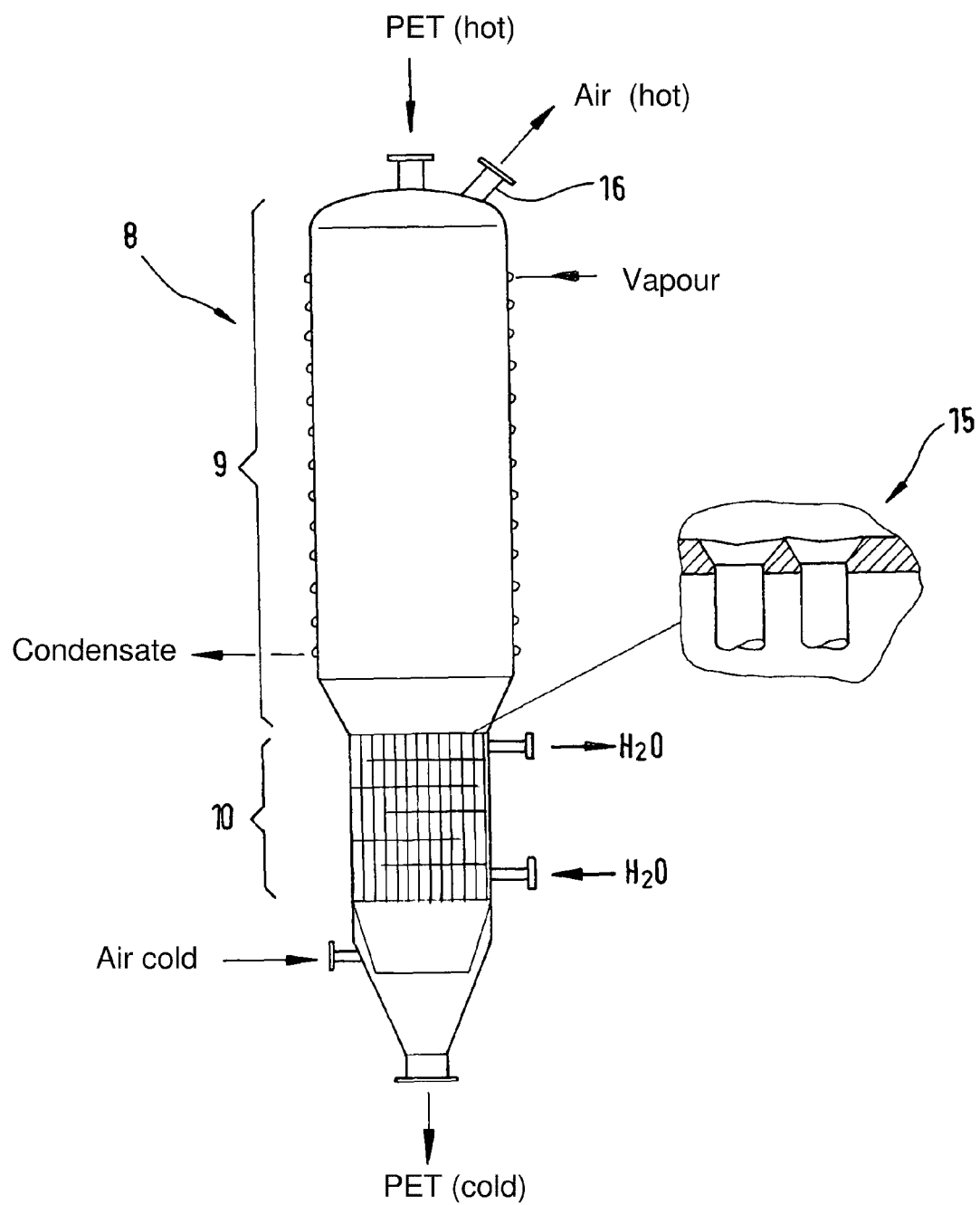

FIG. 1 thereby shows a flow chart of the entire process and
FIG. 2 shows the drying/degassing device.

The entire process is represented in FIG. 1. The course relates to the production of PET.

The highly viscous melt (hiV) is pressed by means of a metering pump 2 which can build up a pressure of >80 bar to 200 bar through a heated nozzle plate 3 (submerged granulation under at least 1 bar excess pressure with a water inlet temperature of at least 70° C., preferably 80-95° C.). A cutting blade ring which runs close to the latter peels off the melt from each hole of the nozzle plate, as a result of which round or oval grains (pellets) are formed and solidify amorphously on the surface due to an intensive water rinse. The water chamber is under slight excess pressure and the liquid to solid ratio is between 8 and 12:1. The pellet/water mixture passes via a short pipe and an agglomerate separator 4 into the pre-dryer 5 which is configured as an agitating centrifuge, the water separation taking place in the lower region and the pellets emerging in the upper region.

It was shown here that, in contrast to the conventional method, it is important to move the liquid to solid ratio towards "zero" within a few seconds dwell time in the pre-dryer 5, i.e. in the lower fifth of the same, to remove the water as completely as possible, in order, on the one hand, to minimise further heat withdrawal from the pellets by the water and, on the other hand, to minimise the surface water film on the pellets such that, as a result of the evaporating water, neither hydrolysis nor supercooling of the pellets from the operating range of 120° C. to 180° C. occurs. It was found at the same time that the ratio of pellets to evaporated water in kg/kg should be only within narrow limits of 100:1 to 20:1 in order to avoid the described disadvantageous results.

These premises underlay the new dryer configuration. In particular the input region of the liquor is configured such that the agitating/conveying spirals which are configured in the form of an open screw, obtain additional conducting elements in the form of a blade or turbine agitator.

As a result, the fluid mass of the liquor is moved towards the periphery of the agitator and can thus be discharged without effort and extremely rapidly through the cylindrical, perforated centrifuge groove there, perforation size and number requiring to be considered. Furthermore for separation of the surface water, a reduction in layer thickness is undertaken in that the bis dato cylindrical centrifuge groove is configured conically at the top, as a result of which the centrifugal forces increase continuously and correspondingly the layer thickness of the water on the pellets reduces. The centrifugal/conveying agitator is constantly adapted to the increase in diameter so that the layer thickness (cake) reduces with ever increasing diameter. The spacing of the agitator/conveying blades to the screen groove also plays a significant role in maximum water separation. Both water and the forming vapour can thus be discharged easily externally through the screen cone. A further advantage of the cone is the increased availability of screen surface which facilitates the passage of water and vapour. It has been shown that a cone-base/basic area diameter of 0.75 to 0.6 produces the best effect for water separation with simultaneous minimisation of the vapour formation.

Astonishingly it was found also that the first crystallisation takes place already in the pre-dryer 5 at <10%. Repeated tests gave the result that then no more agglomeration than is otherwise normal for PET could be established. The necessity for a further crystallisation, e.g. on a vibrating trough, is therefore no longer required. A simple, insulated classifying screen 6 for separating excess lengths suffices to accomplish the further course of diffusion and drying of low-boiling components of the PET.

An injection condenser 9 should be mentioned as a further essential element which optimises the water balance of the casting water circulation so that fewer sludge losses and water losses of the water being treated in an expensive manner by reverse osmosis result.

The injection condenser 9 is connected subsequently directly to the pre-dryer 5 in order to reduce the unavoidably produced water vapour in the dryer to less than 1/10. It emerged from the mass/energy balance that for example with a pellet throughput of 12,000 kg/h, a vapour quantity of 600 kg/h was produced. From this, 530 kg/h was now able to be recovered. Since the injection condenser is disposed in the side flow of the main casting water circulation, the temperature control of the latter, which is of great significance during "die-face-cutting", could therefore be achieved at the same time.

In order reliably to avoid increased hydrolysis, it was shown astonishingly that purging with dry air preheated to 140° C. to 180° C. (heater 10) through the subsequent collecting vessel 7 and by conducting this airflow in the opposite direction to the pellet flow through the classifying screen 6 and the pre-dryer 5, the moisture of which is adjusted to approx. +10° C. dew point, is necessary for a uniformly crystallising and pre-dried product which corresponds to the demands with respect to quality. For this purpose, the air quantity flowing into the collecting vessel 7 is controlled as a function of the dew point at the inlet of the air into the dryer 5 such that a residual moisture of the pellets of <200 ppm, preferably >100 ppm, is achieved at the outlet. The transfer of the hot chips into a delay silo 8 is then effected by means of the same preheated dry air, a "high-density" conveyance being preferred, which conveys the spherical granulate gently into the silo.

Astonishingly, it was shown that further drying at this time counteracts further degassing of the pellets of low-boiling components. It was found that the small quantities of water present in the polyester structure have an entraining effect for the low-boiling components, which are less by a power, acetaldehyde, methyldioxolane and other degradation products of PE, and hence the accelerated expulsion of these materials can be controlled with the help of the residual water component. A temporal reduction in the gas evolution procedure by approx. 30% to 40% relative to conventional methods was found.

The degassing part of the silo 8 is subjected to a flow of cold air, this having a controlled dew point between −10° C. and −40° C. The quantity of air is thereby set via a controller 15 such that the by-products which diffuse out of the pellets and are gaseous under the mentioned temperature conditions are discharged. The ratio of pellet quantity to air quantity is set optimally at 5 to 25. The supply of air is effected for instance at room temperature but below the permissible pellet course temperature of 50° C., the distribution of the air being disposed below a chips/water tubular heat exchanger which is integrated in the silo in order to cool the chips to packaging temperature. The air inlet itself is configured by means of a double cone. The chip cooler ensures further improvement of the distribution of the small quantity of air which bubbles through the pellet column in counterflow. Because of the small quantity of air which has a low enthalpy in relation to the mass of the pellets, a temperature equilibrium is set in the silo 8 which does not impede the temperature-control process. Even a few decimeters above the chip cooler, the temperature of the chip column is in equilibrium with the provided temperature profile of the degassing.

Advantageously, the purging/conveying air is produced by a Konti air dryer system. As an energy-saving variant, the exhaust air of the silo can also be used for purging the collecting container and pre-dryer and also for the conveying air and for regeneration of the air dryer system.

FIG. 2 shows in enlarged representation and in section the configuration of the delay/degassing silo 8. The delay/degassing silo 8 is thereby configured in the form of a perpendicular cylindrical housing. The delay/degassing silo 8 is thereby subdivided into two zones and in fact into one zone of equal temperature 9 and into a cooling zone 10. The heat exchanger of the cooling zone is thereby configured as a tube bundle 15 with machining which is free of dead surfaces on its upper side. It is thereby essential in the case of the delay/degassing silo 8 that the free surface of the heat exchanger tubes relative to the container surface is dimensioned at 1:4 to 1:6 and the L/D ratio of the heat exchanger is at least 1.2:1. The introduction of the dry air below the tube bundle of the heat exchanger is thereby implemented through an annular gap which is produced by a double cone. On the upper side of the container a hot gas outlet 16 is provided. In order to monitor the temperature profile, the delay/degassing silo 8 can have at least 3 measuring points over the entire cylinder height which preferably can be disposed centrally close to the central line of the container (not illustrated). A further characteristic of the delay/degassing silo 8 is that the cylindrical part of the container is equipped with active insulation, e.g. electrical heating, half pipe coil jackets.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding German application No. 10 2007 040 135.5, filed Aug. 24, 2007, and U.S. Provisional Application Ser. No. 60/957,806, filed Aug. 24, 2007, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method for the direct production of polyester granulate from a highly viscous polyester melt (hiV) with a polymerisation degree (PG) of 132 to 165, comprising subjecting the hiV melt to a pre-drying and drying/degassing after a hot cutting method, wherein in the cutting phase in the hot cutting method is effected at water temperatures of 70 to 95° C. and a liquid to solid ratio of 8 to 12:1 is maintained, and wherein classifying with a classifying screen is implemented between pre-drying and drying/degassing, and granulate after classification is purged with temperature-controlled, dry air before drying/degassing in a collecting container.

2. The method according to claim 1, wherein a dwell time in the water of the hot cutting until entry into the pre-drying of <1 second is maintained.

3. The method according to claim 1, wherein liquor from hot cutting is maintained in its entirety until entry into the pre-drying.

4. The method according to claim 1, wherein during the pre-drying in the upper fifth of the pre-dryer, 99% of the circulating water is separated within <10 seconds.

5. The method according to claim 1, wherein during the pre-drying in the pre-dryer, a crystallisation degree of at least 5% is achieved so that the agglomeration of granulates is prevented.

6. The method according to claim 1, in that wherein an outlet moisture of the granulate from the pre-drying of <200 ppm is achieved.

7. The method according to claim 1, wherein the dew point during pre-drying in the pre-dryer is controlled to 8 to 12° C. by means of a quantity of purging air from the collecting container.

8. The method according to claim 7, wherein a moisture of the granulate at the outlet of the collecting container of <200 ppm to >100 ppm is achieved.

9. The method according to claim 7, wherein a crystallisation degree at the outlet of the collecting container of <25% is reached.

10. The method according to claim 1, wherein the dwell time on the classifying screen is at most 30 seconds.

11. The method according to claim 1, wherein a maximum dwell time of 8 minutes is maintained in the collecting container, the temperature-controlled/dried air quantity being used to control the moisture of the pre-dryer.

12. The method according to claim 1, wherein the granulate is brought from the collecting container to the drying in a temperature-control/cooling silo by means of hot air conveyance.

13. The method according to claim 1, wherein the drying is effected in an actively insulated temperature-control/cooling silo, combined drying and cooling being effected.

14. The method according to claim 13, wherein the drying is implemented over 6 to 12 hours at 150 to 180° C., and the cooling over 0.5 to 1.5 hours reducing to 50° C.

15. The method according to claim 1, wherein vapours from the pre-drying are condensed in a mixing condenser, the cooling medium of which is taken from a partial flow of the main water circulation and the mixing condensate of which is used for temperature control of the main water circulation.

16. The method according to claim 15, having a mixing ratio of partial flow to main flow has of a ratio of 1:4 to 1:6.

17. The method according to claim 12, wherein processing of dried air is effected at dew points of −10° C. to −40° C.

18. The method according to claim 12, wherein air introduced in the temperature-control/cooling silo at a maximum temperature of 40° C. in a ratio of 1:5 to 1:10 experiences a quasi laminar distribution through a cooler.

19. The method according to claim 1, wherein PET (polyethylene terephthalate) is produced.

* * * * *

UNITED STATES PATENT AND TRADEMARK OFFICE
CERTIFICATE OF CORRECTION

PATENT NO. : 7,993,557 B2  
APPLICATION NO. : 12/195962  
DATED : August 9, 2011  
INVENTOR(S) : Hanimann et al.

Page 1 of 1

It is certified that error appears in the above-identified patent and that said Letters Patent is hereby corrected as shown below:

Column 7, line 20 reads "6. The method according to claim 1, in that wherein an" should read -- 6. The method according to claim 1, wherein an --

Column 8, line 23 reads "ratio of partial flow to main flow has of a ratio of 1:4 to 1:6." Should read -- ratio of partial flow to main flow of a ratio of 1:4 to 1:6. --

Signed and Sealed this  
Fourteenth Day of February, 2012

David J. Kappos  
*Director of the United States Patent and Trademark Office*

INTER PARTES REEXAMINATION CERTIFICATE (823rd)
United States Patent
Hanimann et al.

(10) Number: US 7,993,557 C1
(45) Certificate Issued: Feb. 10, 2014

(54) METHOD FOR THE PRODUCTION OF POLYESTER GRANULATES FROM HIGHLY VISCOUS POLYESTER MELTS AND ALSO DEVICE FOR THE PRODUCTION OF THE POLYESTER GRANULATES

(75) Inventors: Kurt Hanimann, Rodels (CH); Eike Schulz Van Endert, Berlin (DE); Theodor Anton Bruckmann, Greven-Gimbte (DE)

(73) Assignees: Uhde Inventa-Fischer GmbH, Berlin (DE); BKG Bruckmann & Kreyenborg, Munster (DE)

Reexamination Request:
No. 95/002,263, Sep. 14, 2012

Reexamination Certificate for:
Patent No.: 7,993,557
Issued: Aug. 9, 2011
Appl. No.: 12/195,962
Filed: Aug. 21, 2008

Certificate of Correction issued Feb. 14, 2012

Related U.S. Application Data

(60) Provisional application No. 60/957,806, filed on Aug. 24, 2007.

(51) Int. Cl.
*B29B 9/10* (2006.01)

(52) U.S. Cl.
USPC .................................. 264/142; 264/5

(58) Field of Classification Search
None
See application file for complete search history.

(56) References Cited

To view the complete listing of prior art documents cited during the proceeding for Reexamination Control Number 95/002,263, please refer to the USPTO's public Patent Application Information Retrieval (PAIR) system under the Display References tab.

*Primary Examiner* — Alan Diamond

(57) ABSTRACT

The invention relates to a method and device for the direct production of polyester granulate from a highly viscous polyester melt with a polymerization degree of 132 to 165, as well as the granulates formed therefrom. In the method, the highly viscous polyester melt is subjected to a pre-drying and drying/degassing after a hot cutting method. Hot cutting is implemented at water temperatures of 70° C. to 95° C. and with a liquid to solid ratio of 8 to 12:1.

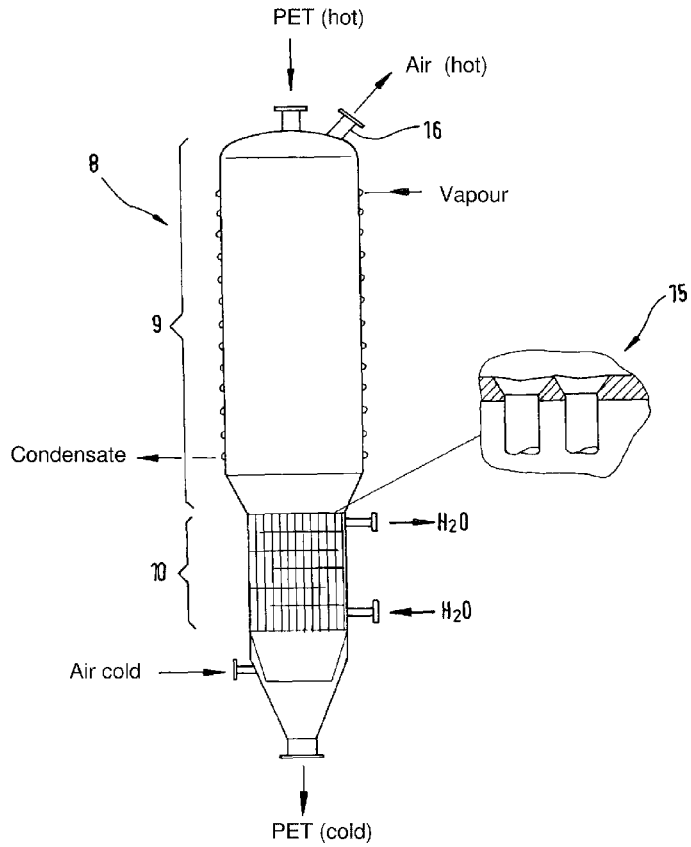

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 15 is cancelled.

Claims 1-3, 5, 7 and 10-13 are determined to be patentable as amended.

Claims 4, 6, 8, 9, 14 and 16-19, dependent on an amended claim, are determined to be patentable.

New claims 20-22 are added and determined to be patentable.

1. A method for the direct production of polyester granulate from a highly viscous polyester melt (hiV) with a polymerisation degree (PG) of 132 to 165, comprising:
   subjecting the hiV melt to a pre-drying and *a* drying/degassing after a hot cutting method,
   wherein in the cutting phase in the hot cutting method *granulate is produced and* is effected at water temperatures of 70 to 95° C. and a liquid to solid ratio of 8 to 12:1 is maintained, and
   wherein classifying with a classifying screen is implemented between pre-drying *in a pre-dryer* and drying/degassing, [and]
   granulate after classification is purged with [temperature-controlled,] dry air *at 140 to 180° C. in a collecting container* before drying/degassing in a [collecting container] *temperature-control/cooling silo, and*
   *vapours from the pre-drying condense in a mixing condenser, the cooling medium of which is taken from a partial flow of a main water circulation and the mixing condensate of which is used for temperature control of the main water circulation.*

2. The method according to claim 1, wherein a dwell time in the water of the hot cutting *method* until entry into the pre-drying of <1 second is maintained.

3. The method according to claim 1, wherein *a* liquor *comprising water and the granulate* from [hot] *the* cutting *phase* is maintained in its entirety until entry into the pre-drying.

5. The method according to claim 1, wherein during the pre-drying in the pre-dryer, a crystallisation degree of at least 5% is achieved so that [the] agglomeration of granulates is prevented.

7. The method according to claim 1, wherein [the] *a* dew point during pre-drying in the pre-dryer is controlled to 8 to 12° C. by means of a quantity of purging air from the collecting container.

10. The method according to claim 1, wherein [the] *a* dwell time on the classifying screen is at most 30 seconds.

11. The method according to claim 1, wherein a maximum dwell time of 8 minutes is maintained in the collecting container, the [temperature-controlled/]dried air [quantity] being used to control [the] *a* moisture of the pre-dryer.

12. The method according to claim 1, wherein the granulate is brought from the collecting container to the drying/*degassing* in [a] *the* temperature-control/cooling silo by means of hot air conveyance.

13. The method according to claim 1, wherein [the drying is effected in an actively insulated] *the* temperature-control/cooling silo *is actively insulated, such that* combined drying and cooling [being] *is* effected.

20. *The method according to claim 1, wherein a reduction in a polycondensation degree starting from the hiV melt to the granulate after drying/degassing is less than 2%.*

21. *The method according to claim 1, wherein a reduction in a polycondensation degree starting from the hiV melt to the granulate after drying/degassing is less than 1.5%.*

22. *The method according to claim 1, wherein the cutting phase is effected at water temperatures of 70° C. to 90° C.*

* * * * *